May 26, 1953     T. A. BAUNSGARD ET AL     2,639,654
SCRAPER-TYPE CULTIVATOR TOOL
Filed April 12, 1948
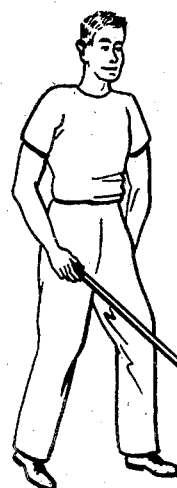
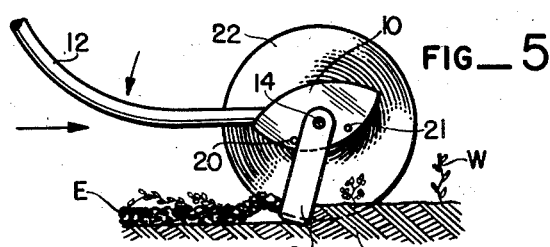
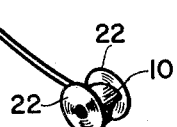
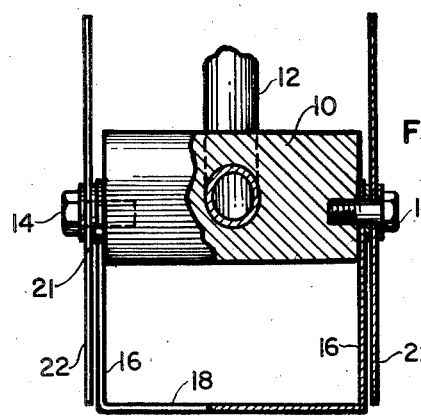
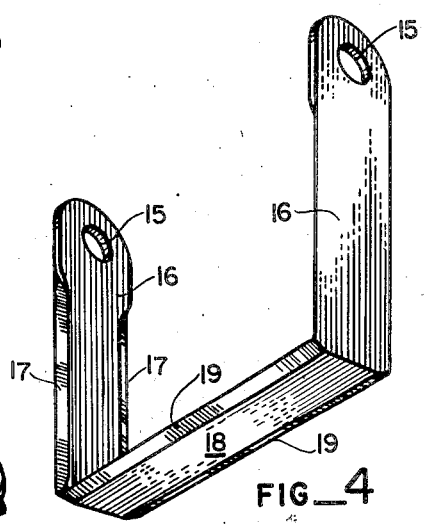
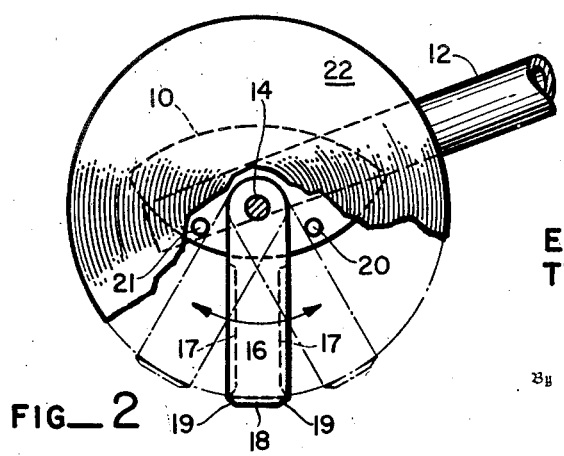
EARL N. BAUNSGARD &
THEODORE A. BAUNSGARD
*Inventors*
By *Smith & Tuck*
Attorneys Patented May 26, 1953

2,639,654

UNITED STATES PATENT OFFICE 2,639,654

SCRAPER-TYPE CULTIVATOR TOOL

Theodore A. Baunsgard, Seattle, and Earl N. Baunsgard, Kirkland, Wash.

Application April 12, 1948, Serial No. 20,464

2 Claims. (Cl. 97—59)

This invention relates to improvements in a scraper-type cultivator tool and, more particularly, to a tool useful in surface cultivation of the ground around plants and for weeding purposes.

Among the important objects of our invention are: to provide a tool that is simple and easy to construct in order that it may sell for a relatively low price, and one that may be operated usefully for its intended purposes with little skill and without requiring substantial strength on the part of the operator; to provide a cultivator tool that may be used in a to-or-fro or shuttling like motion so that an operator may stand in one spot and move the tool back and forth around him and cover a substantial area without much walking; to provide a cultivator tool that can be used around fragile and easily injured plants without harm thereto while removing undesirable plants such as weeds or plants that require being thinned out of the garden; to provide a bladed tool that will cut and pull roots and vines and which is so arranged that the depth of penetration into the ground is gauged and more or less automatically controlled; to provide, in a cultivator tool, a penetration limiting means which determines the ultimate depth of penetration in any given soil condition; to provide a tool that presents a blade to vegetation beneath the soil surface in a planing action involving the elevation of cut vegetation and soil in a manner that the vegetation tends to be loosely deposited on the upper surface; and to provide a wheeled cultivator in which the blade is carried by wheels to the rear of the point of contact of the wheels even though the direction of travel of the wheels may be varied often and quickly.

The foregoing objects and other ancillary thereto, we prefer to accomplish as follows:

According to a preferred embodiment of our invention, we mount upon a wheeled base member, adapted by a handle to be moved over the ground, a U-shaped planing type blade that will be moved in a horizontal manner through the upper soil layers. Specifically, the U-shaped blade has sharpened knife-like edges that are formed in a manner to cause the blade to cut, but tends to climb out of the soil rather than grab and unduly penetrate the same. The edges of the arms of the U-shaped members are also sharpened keenly for cutting purposes. The base member, preferably having a fore-and-aft convexity on the bottom, acts under certain conditions as a runner when the device is worked into the soil a maximum permissible or desirable depth. From the base member extends a handle which is manually grasped and reciprocated to move the base member back and forth. The upper portions of the arms of the U-shaped cutter are pivotally associated each with an opposite side of the base member. Externally of the cutter and the base member on each side; is a wheel to support the device to roll on the ground. Preferably the diameters of these wheels is such that the bottom or cross blade of the U-shaped cutter lies outside the peripheries of the wheels. The U-shaped cutter oscillates back and forth from side to side of the pivotal connection of the same to the base member. Stop means are provided to limit such oscillation of the U-shaped cutter device and normally these stop means are carried by the base member.

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a perspective view of our cultivator tool as it appears in operation;

Fig. 2 is an enlarged fragmentary side view of the tool with a portion of a wheel broken away for convenience of illustration;

Fig. 3 is a face view of the device of Fig. 2 with the right hand portion shown in medial section to illustrate details of construction;

Fig. 4 is an enlarged perspective view of the U-shaped cutter blade; and

Figs. 5 and 6 are similar side views, with a near wheel omitted for convenience of illustration, respectively showing the blade position in the forward and rearward directions of travel of the tool during cultivation operations.

The base member 10 has a handle 12 extending from one side and upwardly as best seen in Fig. 1 to provide a means whereby the tool can be conveniently manipulated. On its underside, base member 10 is convex in a fore-and-aft direction so that the bottom is runner-like and will slide over the ground easily if it contacts the same.

Depending from pivot bolts 14, one on each side of the base member, is an arm 16 and the pair of arms are joined at their lower ends by and support the horizontal cross blade 18. Referring to Fig. 4, it will be seen that the inner faces of the edges of arms 16 are bevelled as at 17 to provide knife-edges for the arms. Similarly the horizontal blade 18 is bevelled underneath, as at 19, to provide opposite knife-edges. Blade 18 is flat on top as can best be observed in Figs. 2, 5 and 6. Bolts 14 pass through holes 15 of the arms 16 and the latter are free to swing on the bolts.

The base member 10 carries stop pins 20, 21, each of which lies to one or the other side of the pivot formed by bolt 14 and therebelow. These pins 20, 21 limit the degree of swing or oscillation of the arms 16 in each direction. While we prefer to use such pins on both sides of the base member, satisfactory performance is obtainable with but one pair of pins.

Mounted alongside of the arms 16 are wheels 22 that rotate on the pins 14. These wheels have a diameter that is such that the horizontal blade 18 lies outside their peripheries as shown in Figs. 2 and 3. To put it another way, the arms 16 extends from their axes a distance greater than the radii of wheels 22 whereby the lateral blade 18 will be outside the wheels and will be caused to oscillate from one side of the point of contact of the wheels with the ground to the other side (as shown in Fig. 2) when the tool direction is changed. Note that the wheels are positioned closely juxtaposed to the outer faces of the arms 16 to preclude plants or gravel or the like becoming lodged therebetween and, further, that the wheels are smooth faced and thin so as to avoid tangling of vegetation with them. The thin rims of the wheels facilitate the operation of the tool by sinking into the earth loosened by the cutter 18 when the tool is used and insure that the horizontal blade 18 can be substantially uniformly disposed below the ground surface.

By forming the base member 10 of a casting, and by providing a hole therethrough the handle 12 is easily attached merely by forcing it into the hole.

*Mode of operation*

Prior to using our tool it is best that the soil be prepared for gardening purposes. Since the device is not a plow, it will not ordinarily cultivate soil that has lain fallow a long time and ground G therefore should be plowed to loosen it and raked level. If a couple of weeks have elapsed since such heavier cultivation and weeds have shown above the soil, or the soil has begun to bake, then is the time that this tool is useful.

Assuming the tool ready for use in the manner indicated in Fig. 1, the operator alternately advances and withdraws it in a shuttling or scuffing action without moving himself except slightly as he covers the ground around him. On the advancing stroke of Fig. 5 the blade 18 tends to follow the wheels and base member since friction and drag caused by its contact with the earth draws it toward the rear stop pin 20. With this arrangement the horizontal blade 18 is canted so that the leading knife edge 19 can bite into and cut the surface of the ground G. Since blade 19 is flat on top and has the bevel forming the fine edge on the bottom, the blade 18 will tend to climb out of the earth. This tendency is resisted, however, by the pressure imparted by the operator through the instrumentality of the handle, base member, and the rear pin 20.

It is preferable that the blade 18 tend to climb out of the earth because, otherwise, too deep penetration would result and the tool would "dig-in" in an undesirable manner.

When the operator reverses the direction of the tool by drawing it toward him, the blade 18 oscillates about its pivot and swings against the forward stop pin 21 to the position of Fig. 6. The operation of the cutter blade is the same except in reverse order to that of a forward stroke.

As the blade cuts in either direction a slice of earth E and such upstanding vegetation, as weeds W, and the like will pass over the flat surface of the blade 18 and be redeposited in a loose layer behind the tool.

The thin edges of the wheels function as gauges and, depending upon the degree of hardness of the earth, serve to govern the penetration depth of the tool into the earth. The wheels also act as guards during use in and around growing plants that the operator may not want to injure during cultivation. In such case the wheels fend off the plants so that the tool can be brought close to the stems and work the soil therearound in very close proximity.

It should be quite obvious that the elements brought together in the illustrated hand-operated tool can be used with equal facility in connection with a power-driven device, as by the use of a small gas engine or the like. It should also be obvious that if an operator desires to use the tool in contact forward motion, pushing it ahead as he walks, the tool performs as described. The oscillation principles described obviates much walking, however, and is for that reason most desirable.

Although we have shown and described a certain specific embodiment of our invention, we are fully aware that many modifications thereof are possible. Our invention, therefore, is not to be restricted except insofar as is necessitated by the prior art and by the spirit of the appended claims.

Having thus described our invention, we claim:

1. A scraper-type cultivator tool, comprising: an elongated base block; a U-shaped cutter blade having substantially straight sides rising at right angles from a substantially straight base, the free ends of said sides being pivotally secured in a coaxial manner to opposite ends of said base block, said base block spanning the space between said free ends and depending below the pivotal axis; a wheel pivotally secured to each end of said base block outside of said cutter blade and coaxial with the pivots thereof, each said wheel being circular with its radius being greater than the thickness of the base block and shorter than said sides of said cutter blade from their point of pivot to said base whereby said base lies beyond the rim of each said wheel, said wheels being planar and formed of sheet metal stock thinner than the blade thickness; said sides of said cutter blade having their inner faces on opposite edges beveled to form knife edges and said base of said cutter blade having its outer face on opposite edges beveled to form knife edges; the lower side of said base block being convexly curved longitudinally to provide a runner-like surface; a handle secured to said base block and extending outwardly and upwardly therefrom; and said base block having stops limiting the swinging of said cutter blade about its pivot.

2. A scraper-type cultivator tool, comprising: a base block; a U-shaped cutter blade having substantially straight sides extending at right angles from a substantially straight base, the free ends of said sides being pivotally secured to corresponding ends of said base block, said base block spanning the space between said free ends and depending below the pivotal axis; a wheel pivotally secured to each end of said base block outside of said cutter blade and coaxial therewith, said wheel being circular with its radius being greater than the thickness of the base block and shorter than said sides of said cutter blade from their point of pivot to said base whereby said base lies beyond the rim of said wheel; opposite edges of said base being sharpened forming knife edges; the lower side of said base block being convex longitudinally to provide a runner-like surface; a handle secured to said base block and extending outwardly and upwardly therefrom; and said base block having stop means limiting the swinging of said cutter blade about its pivot.

THEODORE A. BAUNSGARD.
EARL N. BAUNSGARD.

References Cited in the file of this patent

UNITED STATES PATENTS

| Number | Name | Date |
| --- | --- | --- |
| 45,926 | Kirk | Jan. 17, 1865 |
| 1,212,563 | Rowe | Jan. 16, 1917 |
| 1,309,831 | Alexander | July 15, 1919 |
| 1,739,489 | Wagner | Dec. 10, 1929 |

FOREIGN PATENTS

| Number | Country | Date |
| --- | --- | --- |
| 4,867 | Great Britain | Dec. 22, 1877 |
| 6,786 | Great Britain | Mar. 29, 1899 |
| 412,780 | Great Britain | July 5, 1934 |